(12) United States Patent
Le Rouzic et al.

(10) Patent No.: US 8,792,344 B2
(45) Date of Patent: Jul. 29, 2014

(54) METHOD AND SYSTEM FOR MANAGING SIGNALLING IN A TELECOMMUNICATION NETWORK

(75) Inventors: Jean-Claude Le Rouzic, Trebeurden (FR); Stephane Tuffin, Rospez (FR)

(73) Assignee: France Telecom, Paris (FR)

( * ) Notice: Subject to any disclaimer, the term of this patent is extended or adjusted under 35 U.S.C. 154(b) by 381 days.

(21) Appl. No.: 13/201,834

(22) PCT Filed: Feb. 9, 2010

(86) PCT No.: PCT/FR2010/050211
§ 371 (c)(1),
(2), (4) Date: Feb. 7, 2012

(87) PCT Pub. No.: WO2010/092292
PCT Pub. Date: Aug. 19, 2010

(65) Prior Publication Data
US 2012/0127851 A1 May 24, 2012

(30) Foreign Application Priority Data
Feb. 16, 2009 (FR) ...................................... 09 50994

(51) Int. Cl.
*H04L 12/28* (2006.01)
(52) U.S. Cl.
USPC ....................................................... 370/230.1
(58) Field of Classification Search
None
See application file for complete search history.

(56) References Cited

U.S. PATENT DOCUMENTS

| 6,567,410 | B1* | 5/2003 | Perlman | 370/401 |
| 7,126,907 | B2* | 10/2006 | Carpini et al. | 370/218 |
| 2008/0108348 | A1 | 5/2008 | Kottilingal | |
| 2008/0182575 | A1 | 7/2008 | Torres | |
| 2009/0138593 | A1* | 5/2009 | Kalavade | 709/224 |

FOREIGN PATENT DOCUMENTS

| EP | 1 914 937 | 4/2008 |
| WO | WO 2008/085010 | 7/2008 |

* cited by examiner

*Primary Examiner* — Raj Jain
(74) *Attorney, Agent, or Firm* — Cozen O' Connor

(57) ABSTRACT

A signaling management method for managing signaling in a telecommunications network, in which, in normal operation, access equipment (21) of said network specifies a registration refresh period P to a terminal (10, 11). According to the invention, after said access equipment (21) has detected a fault affecting the network core (22) and then the access equipment (21) has received a registration refresh request from said terminal (10, 11), the access equipment (21): determines the duration R that remains for the registration in the network core (22) for the terminal (10, 11), and also determines the actual refresh period Q as implemented by the terminal (10, 11) in response to the access equipment (21) specifying thereto a refresh period equal to P; and in the event that R≥Q, the access equipment (21) sends registration confirmation to the terminal (10, 11) without relaying said request to the network core (22).

15 Claims, 2 Drawing Sheets

METHOD AND SYSTEM FOR MANAGING SIGNALLING IN A TELECOMMUNICATION NETWORK

RELATED APPLICATIONS

This is a U.S. national stage of application of PCT/FR2010/050211 filed on Feb. 9, 2010.

This application claims the priority of French patent application Ser. No. 09/50994 filed Feb. 16, 2009, the content of which is hereby incorporated by reference.

FIELD OF THE INVENTION

The present invention relates to the means provided in a telecommunications network to deal with a partial or complete fault of the network. It relates particularly (but not exclusively) to networks, for example Internet Protocol (IP) networks, able to use sophisticated session control protocols such as the H.323 protocol and the Session Initiation Protocol (SIP).

BACKGROUND OF THE INVENTION

IP networks enable broadcasting of conversational data (Voice Over IP, Content Sharing, Presence, Instant Messaging, etc.).

The designation H.323 covers a set of protocols for transmission of voice, image and data over IP, as explained in the on-line encyclopedia Wikipedia. These protocols were developed by the ITU-T. They can be grouped together into three categories: signaling, codec (coder-decoder) negotiation, and information transport.

The SIP is defined by the IETF in the document RFC 3261. This protocol makes it possible to set up, modify and terminate multimedia sessions in a network using the Internet Protocol. The SIP also allows event notification procedures and sending information outside the context of a session. It is widely used for instant messaging service commands. Thus in an SIP environment there exist different types of calls such as session set-up requests and requests exchanged outside of any dialogue.

These sophisticated session control protocols make use, in particular, of signaling messages, which are messages enabling a terminal to request a connection with another terminal, and messages signaling that a telephone line is busy, or that the called telephone is ringing, or that the telephone is connected to the network and may be contacted in such or such a manner.

The invention relates particularly (but not exclusively) to IP Multimedia Subsystem (IMS) infrastructures. The IMS is defined by the standards bodies 3GPP (3rd Generation Partnership Project) and TISPAN (Telecommunications and Internet Converged Services and Protocols for Advanced Networking). It is a network architecture introduced by the 3GPP for mobile networks, and then adopted by TISPAN for fixed networks. This architecture enables dynamic setting up and control of multimedia sessions between two clients and reservation of resources at the level of the multimedia stream transport network. It also manages the interaction of services. At present the IMS allows access to telephone, videophone, presence, and instant messaging services.

When a user wishes to obtain the benefit of services offered by an IP network such as those described above, they send network signaling messages that may in particular include various types of request.

First, the user terminals must register with the network. If the network is unable to link this registration and a previous registration (for example following a network fault or the terminal being switched off for longer than a predetermined value), the registration is considered as being an initial registration. After an initial registration, the user terminals must periodically send the network a request to confirm that they wish to maintain their registration.

Moreover, if the network uses the Session Initiation Protocol, user terminals may subscribe to services by sending a corresponding request. This service may be an event notification service: for example, if the user has a voicebox on the network, their terminal may subscribe to a message posting notification service, i.e. it may request to be informed each time that a message is placed in the voicebox; the user terminal may also request to be notified of its registration status; it may equally subscribe to a presence notification service enabling it to receive information published by another user that it has designated, and so on.

Following the initial subscription request, the terminal must periodically send the network a request to renew its subscription.

The various states of the terminal-network system requiring periodic refreshing are commonly referred to as "soft-states". The applicable standards require the terminals to include timers enabling them to send these refresh requests (registration or subscription refresh) automatically.

A terminal is registered with the network core. This registration is maintained only for a predetermined registration lease duration, commonly referred to as "Core_expires", that is represented below for convenience using the letter B; by way of example, above-mentioned document RFC 3261 recommends that B has a value equal to 3600 seconds. In other words, if the network core has received an initial registration request or a registration refresh request from a terminal at an instant $t_0$, then in order to ensure that the registration of the terminal is maintained, it is essential for the network core subsequently to receive a registration refresh request at an instant $t_1$ such that $t_1 - t_0 \leq B$.

More precisely, when a terminal sends an initial registration request to the network, the request is initially received by access equipment that relays it towards the network core. If the network core accepts the registration, it responds to the access equipment with a registration confirmation message that specifies the duration of the above-mentioned registration lease B=Core_expires. Thereafter, the access equipment sends a registration confirmation message to the terminal, which message specifies a certain registration refresh period to the terminal.

It should be observed that this registration refresh period specified to the terminal, commonly referred to as "Access_expires" and referred to below for convenience by the letter P, is not always equal to the above-mentioned period B=Core-expires. For various technical reasons, the access equipment may need to receive refresh requests that are more frequent, such that the refresh period P specified by said access equipment satisfies P<B. This is referred to as "registration caching". By way of example, in certain present networks, a value of P is used that is equal to 1450 seconds. Under such circumstances, the access equipment does not necessarily relay all of the registration refresh requests that it receives from the terminal to the network core: if the time that has elapsed between the instant when it receives a registration refresh request and the instant when it most recently relayed a registration request from the terminal is short compared with B, it may respond to the terminal by confirming its registration thereto and specifying a new said period P, but without relaying the request to the network core.

Finally, terminals are usually programmed so that when a terminal has a registration refresh period P specified thereto, it responds by applying an actual registration refresh period, written below with the letter Q, that has a value that is selected to be shorter than P, by way of precaution. In this respect, various ways of programming terminals are known; for example, the following are to be found:

Q=P/2; or

Q=P−600 seconds; or indeed

Q=P−a few seconds (regardless of the value of P).

After being initially registered, a terminal may, as explained above, subscribe to certain services (for example a message posting notification, presence notification, or registration status notification service). The initial subscription requests are sent either automatically just after initial registration or following user action via the interface of the terminal. For each subscription (initial subscription or subscription refresh), the network informs the terminal of the refresh period required by the network operator for that subscription. In the document RFC 3265, the maximum subscription refresh period used by the core network is defined with reference to the "event-package" part of the document defining the subscription type; for subscribing to the message posting notification service, for example, the document RFC 3842 specifies a refresh period from a few hours to a few days (see under "event-package message summary").

In this context, during normal operation of the network, the network receives initial registration and initial subscription requests and also receives registration and subscription refresh requests as and when network users connect and then renew their registrations and their subscriptions after the provided respective refresh periods. The processing capacity of the nodes of the network is obviously intended to accommodate the corresponding request frequency, in particular as a function of the usual number of network users. In many circumstances, and in particular with so-called "always-on" networks and services, in normal operation, the reconnection rate, and thus the initial rate of registration and subscription, is particularly low.

However, particular problems arise in this situation in the event of a partial or complete fault of the network.

When a fault occurs in the network and users observe or assume that their registration has been lost because of the fault, then the terminals of those users enter a particular mode of operation known as "registration recovery mode" in which the terminals seek to perform an initial registration, which is indeed usually followed by one or more initial subscriptions. The attempted initial registration may result from a user action on the terminal's interface, or it may be performed automatically by the terminal as a function of its programming. For example, the LiveBox terminals from France Telecom are at present programmed to attempt to register every 4 minutes. Thus, the terminals apply a time-out period that usually lies in the range a few tens of seconds to a few minutes, and that is in any event much shorter than the above-mentioned actual registration refresh period Q. This gives rise to an abnormally high rate of registration attempts.

Thus, in the state of the art, while the network restarting, terminals send their respective registration requests in a manner that is slightly offset one relative to another. Throughout a duration that is approximately the mean time-out period, the network therefore needs to accommodate an abnormally high inflow of requests, with this being particularly severe if the fault has lasted a long time. Furthermore, assuming that the network is capable of handling this restart traffic, it will still need to accommodate a new inflow of requests issued by the same terminals at the end of the registration refresh period.

However, the assumption that the network is capable of handling all signaling requests during restarting is often found to be untrue in practice. Each node of the network, as a function of its capacity (which may vary from one node to another), handles the first request that it receives; in so doing, the load level on the node of the network increases rapidly and very often reaches overload. Under such conditions, one or more nodes of the network (in particular in the network core) do not manage to satisfy all requests in time. More precisely, in nodes for which it has not been possible to handle a request:

either the terminals receive a failure response from the network;

or else the terminals do not receive any response in an allotted time ($64 \times T_1$, i.e. 32 seconds if $T_1$=500 milliseconds (ms) in application of document RFC 3261), and they deduce therefrom that their registration request has failed.

These terminals will therefore perform successive registration attempts that are mutually spaced apart by said time-out period until they finally manage to become connected or reconnected (or give up trying . . . ).

For a given terminal, the time for which the terminal must wait after a network fault before being registered again is therefore on average an increasing function of its time-out period. The expression "on average" refers to the fact that, for a given terminal, this time also depends on the moment at which the terminal attempts to register relative to the moment at which the fault clears. If by chance it attempts to register just after the fault clears, and assuming that the network is not overloaded, it is virtually certain that it will succeed in registering; in contrast, if it attempts to register just before the fault clears, it will have to wait the entire time-out period before attempting again to register.

To summarize, when a fault occurs in known telecommunications systems, the network is observed to saturate and some users have to wait for a long time before they manage to connect or reconnect.

SUMMARY OF THE INVENTION

One aspect of the present invention provides a signaling management method for managing signaling in a telecommunications network, in which, in normal operation, access equipment of said network specifies a registration refresh period P to a terminal. Said method is remarkable in that after said access equipment has detected a fault affecting the network core and then the access equipment has received a registration refresh request from said terminal, the access equipment:

determines the duration R that remains for the registration in the network core for the terminal, and also determines the actual refresh period Q as implemented by the terminal in response to the access equipment specifying thereto a refresh period equal to P; and in the event that R≥Q, it sends registration confirmation to the terminal without relaying said request to the network core.

Thus, according to the invention, access equipment that has detected a fault in the network firstly confirms registration to a terminal sending a registration refresh request, and secondly refrains from relaying the request to the network core. Preferably, the access equipment returns to its normal mode of operation (i.e. non-fault mode) as soon as it detects the end of the fault.

By avoiding the access equipment relaying these registration refresh requests to the network core, the invention makes it possible to eliminate the risk of the terminal being subjected to a refresh request failure, such that the terminal does not perceive that a fault has occurred. More precisely, providing the fault is short enough, the terminal may perceive that there has been a fault only if the terminal has been prevented from using a service (e.g. placing a call to another user) because of the fault, in which case, depending on how it is programmed, it may optionally attempt to re-register.

The invention thus serves to reduce the number of terminals that enter into registration recovery mode following the fault, such that the signaling traffic congestion caused by this mode is reduced. In particular, if the network includes a backup server in the network core (where a priori a backup server has processing capacity that is less than that of the faulty primary server), then this reduction in registration recovery traffic makes it possible to delay the switchover of traffic to the backup server, which leaves the network operator more time to attempt to repair the fault before switching traffic over to the backup server.

Furthermore, the quality of service as perceived by users, known as "quality of experience" (QoE), is naturally increased.

Finally, it should be observed that mechanism of the invention is advantageously independent of how the terminals are programmed.

According to particular characteristics, when $R \geq Q$, the access equipment specifies a registration refresh period $S=P$ to said terminal.

By means of these provisions, the access network continues (for a certain length of time) to interact with said terminal as in normal operation.

According to other particular characteristics, said access equipment sends a registration confirmation to the terminal without relaying said request to the network core, likewise in the event that $\epsilon < R < Q$, where $\epsilon$ is a predetermined positive or zero duration.

By means of these provisions, the access equipment continues to avoid relaying registration refresh requests received from the terminal to the network core—at least until the registration has expired ($t_1 - t_0 = B$, i.e. $R=0$). By acting in this way to delay as much as possible any retransmission of a registration refresh request to the network core, the risk of the terminal being subjected to a failure of a refresh request is delayed, with the terminal thus remaining unaware of the existence of the fault. As a result, the number of terminals that enter into a registration recovery mode following a fault is thus spread out over time.

$\epsilon$ is taken to be non-zero if it is believed that for $0 < R \leq \epsilon$, it is not worth requiring the terminal to send a new registration refresh request within an extremely short period; under such circumstances, it is possible for example for $\epsilon$ to be taken to be of the order of a few seconds.

According to even more particular characteristics, when $\epsilon < R < Q$, the access equipment specifies a registration refresh period $S=R+P-Q$ to the terminal.

By means of these provisions, the terminal sends a next registration refresh request to the access equipment in such a manner that R is zero.

According to particular characteristics, after the access equipment has received a refresh request for a predetermined type of subscription from said terminal, the access equipment:

determines the remaining duration R' for said type of subscription in the network core for the terminal, and also determines the actual refresh period Q' implemented by the terminal after the access equipment has specified thereto a refresh period equal to P', where P' is the refresh period for said type of subscription as specified to the terminal by the access equipment in normal operation; and when $R' \geq Q'$, it sends to the terminal confirmation for the subscription of said type without relaying said request to the network core.

According to even more particular characteristics, the access equipment sends to the terminal confirmation for said type of subscription without relaying said request to the network core, likewise in the event that $\epsilon' < R' < Q'$, where $\epsilon'$ is a predetermined positive or negative duration.

By means of these provisions, it is also possible to eliminate or at least delay the transfer to the network core of subscription requests, so as to avoid congestion of the network as a result of a fault.

Another aspect of the invention provides a signaling management system for managing signaling in a telecommunications network, the system including access equipment to said network that, in normal operation, specifies a registration refresh period P to a terminal. This system is remarkable in that said access equipment possesses means for acting after said access equipment has detected a fault affecting the network core and after the access equipment has received a registration refresh request from said terminal:

to determine the duration R remaining for the registration in the network core for the terminal, and also to determine the actual refresh period Q implemented by the terminal when the access equipment has specified thereto a refresh period equal to P; and when $R \geq Q$, to send to the terminal a registration confirmation without relaying said request to the network core.

According to particular characteristics, when $R \geq Q$, the access equipment also possesses means for specifying to said terminal a registration refresh period $S=P$.

According to other particular characteristics, said access equipment also possesses means for sending to the terminal a registration confirmation without relaying said request to the network core, likewise when $\epsilon < R < Q$, where $\epsilon$ is a predetermined positive or zero duration.

According to even more particular characteristics, when $\epsilon < R < Q$, the access equipment also possesses means for specifying to the terminal a registration refresh period $S=R+P-Q$.

According to other particular characteristics, said access equipment also possesses means for acting, after the access equipment has received a refresh request for a predetermined type of subscription from said terminal;

to determine the duration R' remaining for said type of subscription in the network core for the terminal, and also to determine the actual refresh period Q' as implemented by the terminal when the access equipment has specified thereto a refresh period equal to P', where P' is the refresh period for said type of subscription specified to the terminal by the access equipment in normal operation; and when $R' \geq Q'$, to send to the terminal a confirmation for the subscription of said type without relaying said request to the network core.

According to even more particular characteristics, the access equipment also possesses means for sending to the terminal confirmation for said type of subscription without relaying said request to the network core also in the event that $\epsilon'<R'<Q'$, where $\epsilon'$ is a predetermined positive or zero duration.

The advantages offered by these signaling management systems are essentially the same as those offered by the corresponding methods set out briefly above.

It should be observed that it is possible to make a signaling management system as set out briefly above in the context of software instructions and/or in the context of electronic circuits.

Said access equipment may in particular comprise a server-computer. In particular, when the telecommunications network infrastructure is of the IMS type, the server may advantageously be constituted by a P-CSCF server.

Another aspect of the invention provides a computer program downloadable from a communications network and/or stored on a computer-readable medium and/or executable by a microprocessor. The computer program is remarkable in that it includes instructions for executing steps of any of the signaling management methods set out briefly above, when executed on a computer.

The advantages offered by the computer program are essentially the same as those offered by said methods.

BRIEF DESCRIPTION OF THE DRAWINGS

Other aspects and advantages of the invention appear on reading the following detailed description of particular embodiments, given as non-limiting examples. The description refers to the accompanying figures, in which.

DETAILED DESCRIPTION OF THE DRAWINGS

Figure 1:
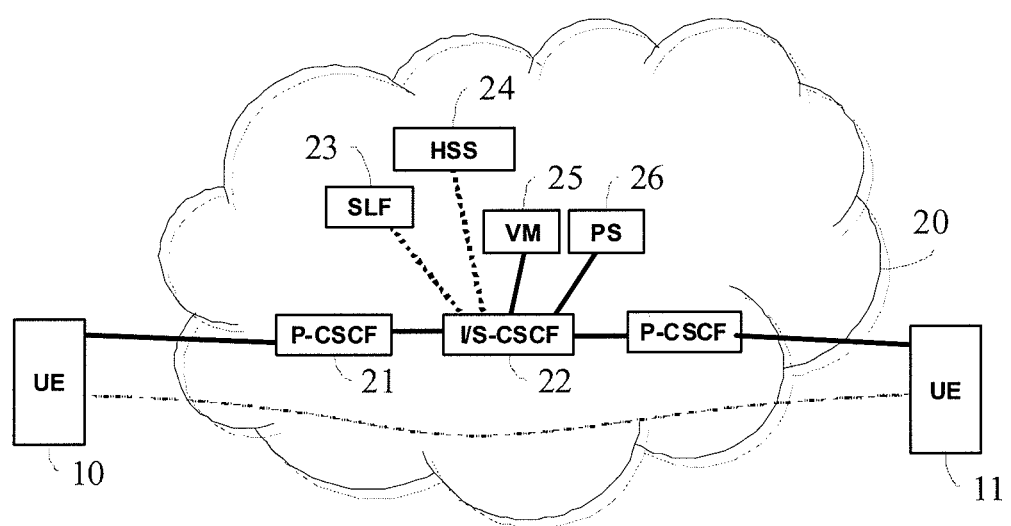
FIG. 1 is a diagram of a system for providing multimedia services and suitable for implementing the invention.

The system shown in FIG. 1 is based on an IMS type network architecture, as succinctly presented above. The multimedia services offered by such a system may include telephony services, videotelephony services, content-sharing services, presence services, instant messaging services, or television services. These services are available to the user of a terminal (user equipment (UE)) 10 in a network 20 having an IP transport infrastructure and including IMS servers via which the terminal 10 is able to exchange SIP signaling messages and multimedia streams, in particular with another terminal (UE) 11, the terminals 10 and 11 being registered beforehand with the IMS servers of the network 20.

The terminals 10 and 11 are fixed or mobile terminals that have SIP signaling means and that may include means for reproducing an audiovisual content.

As FIG. 1 shows, this service provision system relies on a network 20 conforming to the IMS architecture defined by the 3GPP, including:
an IP transport infrastructure (not shown);
one or more I/S-CSCF routing servers combining an interrogating-call server control function and a serving-call server control function in the same server; an I/S-CSCF routing server 22 managing in particular the procedure for registering the terminal 10 in the network 20, routing signaling between the terminal 10 and the voicemail (VM) application server 25 and presence service (PS) application server 26 hosting the services to which the user of the terminal 10 subscribes, as well as routing to other terminals managed by the same IMS network, for example the terminal 11, and routing signaling between the IMS network 20 and other networks (not shown);
one or more proxy-call server control function (P-CSCF) servers; a P-CSCF server 21 is the SIP contact point of the terminal 10 in the IMS network; thus all SIP signaling exchanged between the terminal 10 and the I/S-CSCF routing server 22 managing the terminal 10 passes through this P-CSCF server 21;
one or more home subscriber server (HSS) type database servers; an HSS server 24 contains the profile of the user of the terminal 10 in terms of authentication, location, and subscribed services data;
optionally, a subscriber location function (SLF) server; an SLF server 23 is used in networks containing a plurality of HSS servers; this SLF server 23 is interrogated by the I-CSCF and S-CSCF functions to discover the address of the HSS server 24 hosting the data of the user of the terminal 10;
one or more voicemail (VM) application servers; a VM server 25 manages voicemail for the user of the terminal 10; in particular, the VM server 25 manages the subscription of the terminal 10 to the message posting/reading events of the user of this terminal, and notifies the terminal 10 of the occurrence of these events; and
one or more presence (PS) application servers; a PS server 26 manages in particular the subscription of the terminal 10 to the presence events that the user of this terminal wishes to monitor, and notifies the terminal of the occurrence of these events.

The HSS database server 24 is consulted in particular:
by the I-CSCF function on registration of the terminal 10 in order to allocate a I/S-CSCF server 22 to the user of this terminal or to discover the I/S-CSCF server 22 already allocated to this user;
by the S-CSCF function on initial registration of the user of the terminal 10 in order to download data concerning the services to which this user subscribes, including in particular the detection points that enable the I/S-CSCF server 22 to determine which signaling message it must route to which application server (for example the VM server 25 and the PS server 26);
by the S-CSCF function on registering the user of the terminal 10, in order to inform the HSS server 24 of the setting up or extension of this user's registration with the I/S-CSCF server 22; and
by the S-CSCF function, in order to recover the information necessary to authenticate the signaling sent by the user of the terminal 10.

The terminal 10 must necessarily be registered with the network core (specifically the I/S-CSCF server 22) so that the user of the terminal can make use of the services provided by the network 20 from said terminal. In the context of the SIP protocol, the registration procedures make use of a request known as "SIP REGISTER".

The initial registration procedure of the terminal 10 is normally executed when the terminal is started (or when an application installed on the terminal is started) by the user. As explained above, a registration has a duration of validity that is limited in time: the duration $(t_1-t_0)$ between two registration requests (initial or refresh) received by the network core 22 must be less than or equal to a predetermined registration lease duration (commonly referred to as "Core_expires" and written B in the present specification). In normal operation, the terminal 10 refreshes its registration automatically and periodically. The periodicity Q with which refresh requests are sent by the terminal 10 depends firstly on the refresh period (commonly referred to as "Access_expires", and written P in the context of the present specification, that is specified thereto by the access equipment (specifically the P-CSCF server 21), and secondly on the way the terminal is programmed. [Note: in order to simplify the present description, no account is taken of the transit times of messages within the network; where necessary, the person skilled in the art knows how to make the necessary adjustments.]

When the network uses a "registration caching" function, the refresh period P specified to the terminal is shorter than the registration lease period B applied in the network core 22. Furthermore, under such circumstances, the access equipment 21 usually relays a registration refresh request as received at an instant $t_1$ from the terminal 10 to the network core 22 if, and only if, $t_1 - t_0 > (B/2)$, where $t_0$ is the instant at which the latest registration refresh request was retransmitted to the network core 22; the request received at instant $t_1$ is thus in fact the $n^{th}$ request received by the access equipment 21 from the terminal 10 after the instant $t_0$, where:

$$n = \mathrm{INT}\left[\frac{(B/2)}{Q} + 1\right],$$

and $t_1 - t_0 = n \times Q$ in which INT designates the integer portion. For example, with the following numerical values:
B=3600 seconds, P=1450 seconds; and
Q=P−600 seconds=850 seconds
this gives n=3, such that the access equipment 21 relays a registration refresh request to the network core 22 once every n×Q=2550 seconds.

Some services, such as those of the VM server 25 and the PS server 26, rely on the terminal 10 subscribing to events (for example message posting/reading or presence events). The procedure for initially subscribing the terminal 10 to the network 20 is normally executed when starting up the terminal (or an application installed on the terminal) by the user, just after the initial registration procedure. An initial subscription procedure is executed for each type of event subscribed to (for example initial subscription to message posting/reading events is independent of initial subscription to presence events). A subscription has a time-limited duration. This duration may be different for each type of event subscribed to, and is also independent of the registration duration. Under normal operating conditions, the terminal 10 must renew its subscription or subscriptions to events automatically and periodically. As mentioned above, these requests for maintaining event subscriptions are referred to as "subscription refresh requests". In the SIP context, event subscription procedures use an "SIP SUBSCRIBE" request.

Different types of fault may render unavailable the services provided by the network 20 to the user of the terminal 10. In particular:
faults of type "A" the consequence of which is loss of data associated with the registration of the terminal 10 with the P-CSCF server 21, the I/S-CSCF server 22, or the HSS server 24;
faults of type "B" the consequence of which is blocking transmission of signaling between the terminal 10 and the P-CSCF server 21 or between the P-CSCF server 21 and the I/S-CSCF server 22 or between the I/S-CSCF server 22 and the SLF server 23 or between the I/S-CSCF server 22 and the HSS server 24 (this essentially concerns the IP transport infrastructure of the network 20).

It is usually found that type "B" faults are the more frequent, giving rise to greater service unavailability than type "A" faults.

Whatever type of fault, it is clear that a non-registered terminal seeking to connect to the network during the fault will suffer from initial registration request failing (failure response from the network or no response within the allotted time). As for terminals that were already registered before the beginning of the fault, they necessarily become aware of the existence of the fault in the event that the duration of the fault is longer than the period of the registration lease (i.e. when a registration refresh request does not succeed).

When the duration of the fault is less than or equal to the period of the registration lease, the authors of the present invention have observed that a terminal that was registered before the beginning of the fault can perceive that a fault exists only:
if it tries to place a call without success (which depends on the way in which the fault affects its connection); or
if it sends a registration refresh request that does not succeed.

However, as mentioned above, the network operator 20 has great interest in seeking to diminish the number of users who become aware of a fault. In the above conditions, the invention serves in particular to eliminate or at least slow down any risk of a terminal seeing one of its registration refresh requests failing (with this depending on the duration of the fault and on the length of time that has elapsed since the most recent registration on the terminal when the fault occurred).

In the present embodiment of the invention, after the P-CSCF server 21 has detected a fault affecting the I/S-CSCF server 22 and then the P-CSCF server 21 receiving a registration refresh request from the terminal 10, the P-CSCF server 21 refrains from relaying the request to the I/S-CSCF server 22:
when $R \geq Q$, where R is the remaining period of registration at the I/S-CSCF server 22 for the terminal 10, then the P-CSCF server 21 specifies a registration refresh period S=P to the terminal 10; or
when $\epsilon < R < Q$, where $\epsilon$ is a predetermined positive or zero duration, then the P-CSCF server 21 specifies a registration refresh period S=R+P−Q to the terminal 10.

It is recalled that P designates the registration refresh period specified by the P-CSCF server 21 to the terminal 10 in normal operation (i.e. when there is no fault), and Q is the actual refresh period implemented by the terminal 10 when the P-CSCF server 21 has specified thereto a refresh period equal to P.

In this respect, it should be observed that in the state of the art there exist various means for enabling a telecommunications network node to detect failure of another node of the network. Such means may for example rely on detecting the absence of signaling messages being received during a certain period of time between the two nodes. In order to make such a detection, it is possible in particular to rely on the signaling messages sent by the terminals and normally relayed by the nodes, or on the sending of signaling messages that are exchanged solely between two nodes, or indeed on a combination of both methods. Detecting the end of the fault relies on receiving signaling messages coming from the node that was previously considered as being faulty.

Figure 2:
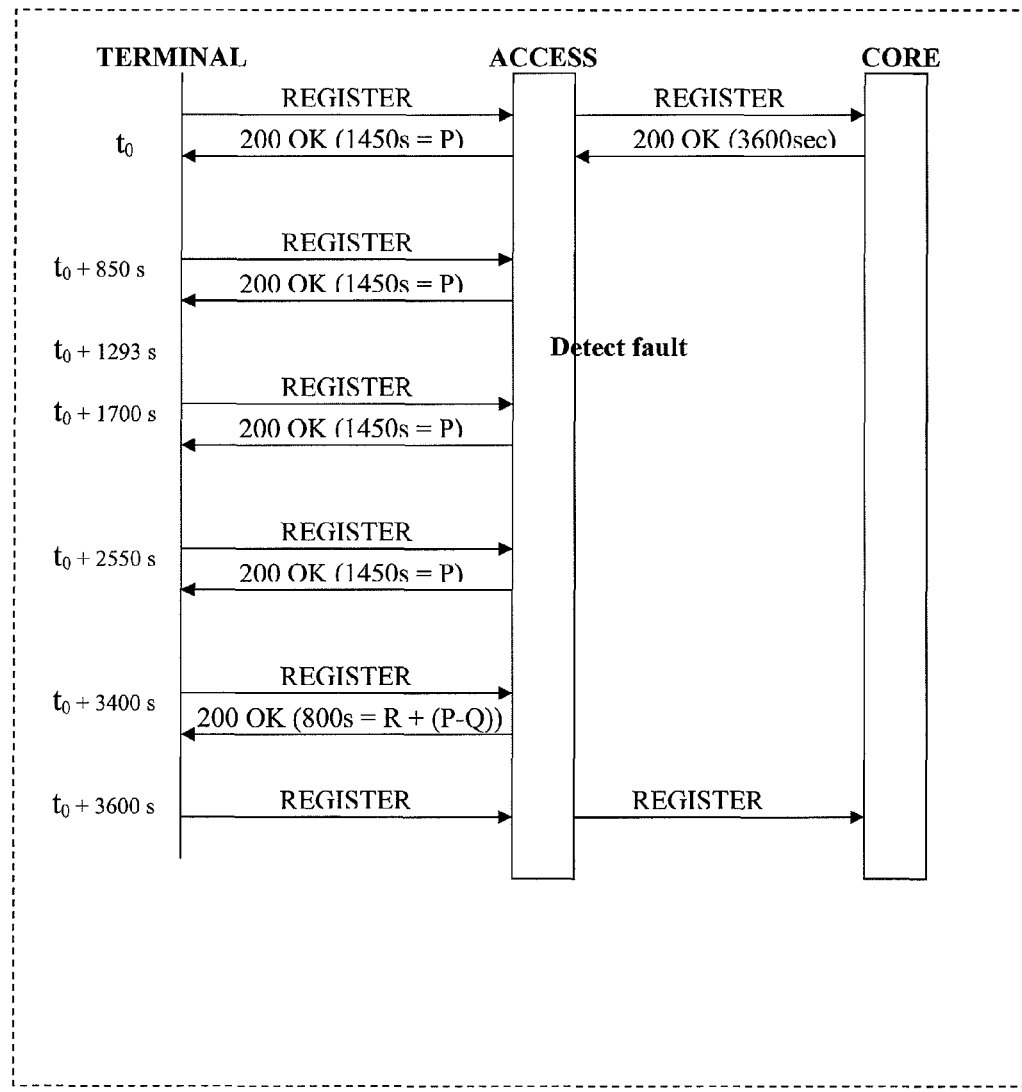
FIG. 2 shows an example of the invention being applied to the procedure for refreshing the registration of a terminal during a fault.

The operation and the advantages of the invention are illustrated below by means of a numerical example, given with reference to FIG. 2.

In this example, consideration is given to a terminal 10 that is programmed to implement an actual registration refresh period that is 600 seconds shorter than the registration refresh period (whatever its value) specified thereto by the equipment that gives it access to the network 20 (specifically the P-CSCF server 21). Furthermore, it is assumed that the P-CSCF server 21 performs registration caching (P=1450 seconds<B=3600 seconds, where B is the duration of the registration lease from the network core, specifically the I/S-CSCF server 22). Finally, $\epsilon$ is selected to be equal to 10 seconds.

At the instant $t=t_0$, the terminal 10 sends a registration request (initial or refresh) to the P-CSCF server 21. The P-CSCF server 21 relays the registration request to the I/S-CSCF server 22 which responds to the P-CSCF server 21 by accepting the registration (a message of the "200 OK" type in the SIP protocol) and by specifying a refresh period of B=3600 seconds. The P-CSCF server 21 confirms its registration to the terminal 10 (message "200 OK") and a refresh period P=1450 seconds, thereto.

At the instant $t=t_0+850$ seconds (since Q=1450−600=850 seconds), the terminal 10 sends a registration refresh request to the P-CSCF server 21; the P-CSCF server 21 confirms its registration to the terminal 10 and specifies thereto a refresh period of P=1450 seconds. The P-CSCF server 21 does not relay the registration request to the I/S-CSCF server 22 since $t-t_0=850<(B/2)=1800$ seconds. In contrast, the P-CSCF server 21 notes that the terminal 10 is programmed for Q=P−600 seconds, if that has not already been done.

At the instant $t=t_0+1293$ seconds, the P-CSCF server 21 detects a fault in the network 20.

At the instant $t=t_0=1700$ seconds (since 850+850=1700), the terminal 10 sends a registration refresh request to the P-CSCF server 21. The P-CSCF server 21 observes that the terminal 10 is still registered with the I/S-CSCF server 22 for a duration $R=B-(t-t_0)=3600-1700=1900$ seconds, which is greater than Q=850 seconds. Consequently, the P-CSCF server 21 confirms its registration to the terminal 10, specifying thereto a refresh period S=P=1450 seconds. It should be observed that in accordance with the invention, the P-CSCF server 21 does not relay this registration request to the I/S-CSCF server 22, but it would not have done so in the prior art either since $t-t_0=1700<(B/2)=1800$ seconds.

At the instant $t=t_0+2550$ seconds (since 1700+850=2550), the terminal 10 sends a registration refresh request to the P-CSCF server 21. Since $t-t_0=2550>(B/2)=1800$, this request, would, in the prior art, have been forwarded to the I/S-CSCF server 22. However, the P-CSCF server 21 observes that the terminal 10 is still registered with the I/S-CSCF server 22 for a duration $R=B-(t-t_0)=3600-2550=1050$ seconds, which is greater than Q=850 seconds. Consequently, in accordance with the invention, the P-CSCF server 21 does not relay this request to the I/S-CSCF server 22. The P-CSCF server 21 confirms its registration to the terminal 10 and specifies thereto a refresh period S=P=1450 seconds.

At the instant $t=t_0+3400$ seconds (since 2550+850=3400), the terminal 10 sends a registration refresh request to the P-CSCF server 21. The P-CSCF server 21 observes that the terminal 10 is still registered with the I/S-CSCF server 22 for a duration $R=B-(t-t_0)=3600-3400=200$ seconds, which although greater than $\epsilon=10$ seconds, is now less than Q=850 seconds. Consequently, the P-CSCF server 21 confirms its registration to the terminal 10 and specifies thereto a refresh period S=R+P−Q=200+600=800 seconds.

Finally, at the instant $t=t_0+3600$ seconds (since 3400+(800−600)=3600), the terminal 10 sends a registration refresh request to the P-CSCF server 21. The P-CSCF server 21 observes that the terminal 10 is still registered with the I/S-CSCF server 22 for a duration $R=B-(t-t_0)=3600-3600=0$ seconds which is less than $\epsilon=10$ seconds (in this example clearly nothing would have changed if $\epsilon$ had been selected to be zero). Consequently, the P-CSCF server 21 relays (or at least attempts to relay) the registration request to the I/S-CSCF server 22.

In addition, and optionally, it is possible to apply an analogous method to such and such a type of available subscription (or optionally to an aggregated plurality of types).

The invention may be implemented by means of software and/or hardware components in nodes of the telecommunications network and in particular within access equipment (to be more precise, the P-CSCF servers in the embodiment described above).

The software components could be integrated into a conventional network node management computer program. This is why, as indicated above, the present invention also provides a data processing system. That data processing system conventionally includes a central processor unit controlling a memory by means of signals, as well as an input unit and an output unit. Moreover, this data processing system may be used to execute a computer program including instructions for executing the signaling management method of the invention.

The invention also provides a computer program downloadable from a communications network including instructions for executing steps of a signaling management method of the invention when it is executed on a computer. This computer program may be stored on a computer-readable medium and adapted to be executed by a microprocessor.

This program may use any programming language and take the form of source code, object code, or a code intermediate between source code and object code, such as a partially-compiled form, or any other desirable form.

The invention also provides a computer-readable information medium containing instructions of a computer program as referred to above.

The information medium may be any entity or device capable of storing the program. For example, the medium may include storage means, such as a ROM, for example a CD ROM or a micro-electronic circuit ROM, or magnetic storage means, for example a floppy disk or a hard disk.

Moreover, the information medium may be a transmissible medium such as an electrical or optical signal, which may be routed via an electrical or optical cable, by radio or by other means. The computer program of the invention may in particular be downloaded over an Internet type network.

Alternatively, the information medium may be an integrated circuit in which the program is incorporated, the circuit being adapted to execute the signaling management method of the invention or to be used in its execution.

The invention claimed is:

1. A signaling management method for managing signaling in a telecommunications network, in which, in normal operation, access equipment of said network specifies a registration refresh period P to a terminal wherein after said access equipment has detected a fault affecting the network core and after the access equipment has subsequently received a registration refresh request from said terminal, the access equipment:
   determines the duration R that remains for the registration in the network core for the terminal;
   determines the actual refresh period Q as implemented by the terminal in response to the access equipment specifying thereto a refresh period equal to P; and
   sends, when R≥Q, registration confirmation to the terminal without relaying said request to the network core.

2. The signaling management method according to claim 1, wherein when R≥Q, the access equipment specifies a registration refresh period S=P to said terminal.

3. The signaling management method according to claim 1, wherein said access equipment also sends a registration confirmation to the terminal without relaying said request to the network core when $\epsilon<R<Q$, where $\epsilon$ is a predetermined positive or zero duration.

4. The signaling management method according to claim 3, wherein when $\epsilon<R<Q$, the access equipment specifies a registration refresh period $S=R+P-Q$ to the terminal.

5. The signaling management method according to claim 1, wherein after the access equipment has received a refresh request for a predetermined type of subscription from said terminal, the access equipment:
   determines the remaining duration R' for said type of subscription in the network core for the terminal, and also determines the actual refresh period Q' implemented by the terminal after the access equipment has specified thereto a refresh period equal to P', where P' is the refresh period for said type of subscription as specified to the terminal by the access equipment in normal operation; and
   when $R'\geq Q'$, it sends to the terminal confirmation for the subscription of said type without relaying said request to the network core.

6. The signaling management method according to claim 5, wherein the access equipment also sends to the terminal confirmation for said type of subscription without relaying said request to the network core when $\epsilon'<R'<Q'$, where $\epsilon'$ is a predetermined positive or negative duration.

7. A signaling management system for managing signaling in a telecommunications network, the system including access equipment to said network that, in normal operation, specifies a registration refresh period P to a terminal, wherein said access equipment includes means for acting after said access equipment has detected a fault affecting the network core and after the access equipment has subsequently received a registration refresh request from said terminal:
   to determine the duration R remaining for the registration in the network core for the terminal, and also to determine the actual refresh period Q implemented by the terminal when the access equipment has specified thereto a refresh period equal to P; and
   when $R\geq Q$, to send to the terminal a registration confirmation without relaying said request to the network core.

8. The signaling management system according to claim 7, wherein $R\geq Q$, the access equipment includes means for specifying to said terminal a registration refresh period $S=P$.

9. The signaling management system according to claim 7, wherein said access equipment includes means for sending to the terminal a registration confirmation without relaying said request to the network core when $\epsilon<R<Q$, where $\epsilon$ is a predetermined positive or zero duration.

10. The signaling management system according to claim 9, wherein when $\epsilon<R<Q$, the access equipment includes means for specifying to the terminal a registration refresh period $S=R+P-Q$.

11. The signaling management system according to claim 7, wherein said access equipment includes means for acting, after the access equipment has received a refresh request for a predetermined type of subscription from said terminal;
   to determine the duration R' remaining for said type of subscription in the network core for the terminal, and also to determine the actual refresh period Q' as implemented by the terminal when the access equipment has specified thereto a refresh period equal to P', where P' is the refresh period for said type of subscription specified to the terminal by the access equipment in normal operation; and
   when $R'\geq Q'$, to send to the terminal a confirmation for the subscription of said type without relaying said request to the network core.

12. The signaling management system according to claim 11, wherein the access equipment includes means for sending to the terminal confirmation for said type of subscription without relaying said request to the network core when $\epsilon<R'<Q'$, where $\epsilon'$ is a predetermined positive or zero duration.

13. The signaling management system according to claim 7, wherein said telecommunications network is of the IMS type and said access equipment comprises a P-CSCF server.

14. Permanent or partially or completely removable data storage means including computer program code instructions for executing steps of a signaling management method according to claim 1.

15. A computer program downloadable from a communications network and/or stored on a computer readable medium and/or executable by a microprocessor, wherein the program includes instructions for executing steps of a signaling management method according to claim 1, when executed on a computer.

\* \* \* \* \*